United States Patent [19]
Miyairi

[11] Patent Number: 5,884,898
[45] Date of Patent: Mar. 23, 1999

[54] BUTTERFLY VALVE FOR HOT FLUID

[75] Inventor: Yukio Miyairi, Nagoya, Japan

[73] Assignee: NGK Insulators, Ltd., Nagoya, Japan

[21] Appl. No.: 578,483

[22] Filed: Dec. 26, 1995

[30] Foreign Application Priority Data

Dec. 26, 1994 [JP] Japan .................................. 6-322254
Dec. 13, 1995 [JP] Japan .................................. 7-324244

[51] Int. Cl.$^6$ ..................................................... F16K 1/22
[52] U.S. Cl. ........................................... 251/305; 251/306
[58] Field of Search ..................................... 251/305, 306

[56] References Cited

U.S. PATENT DOCUMENTS

| | | | |
|---|---|---|---|
| 3,921,955 | 11/1975 | Haddad, Jr. ............................ | 251/297 |
| 4,465,260 | 8/1984 | Conley et al. ......................... | 251/305 |
| 5,370,361 | 12/1994 | Mendell et al. ..................... | 251/305 X |

FOREIGN PATENT DOCUMENTS

| | | |
|---|---|---|
| 1 342 200 A | 5/1964 | France . |
| 1 080 813 B | 4/1960 | Germany . |
| 24 22 519 A | 11/1975 | Germany . |
| 39 30 779 A | 4/1991 | Germany . |
| 7-198045 A | 8/1995 | Japan . |
| 7-269332 A | 10/1995 | Japan . |
| 1 239 520 | 7/1971 | United Kingdom . |

OTHER PUBLICATIONS

Katsuhiko Tsuchiya et al., 372 Automotive Engineering, vol. 88, No. 9 (1980), pp. 82–86.

*Primary Examiner*—John Fox
*Attorney, Agent, or Firm*—Kubovcik & Kubovcik

[57] ABSTRACT

A butterfly valve for hot fluid, including: a cylindrical duct; a flap pivotally mounted inside said duct; a shaft attached to said flap so that a rotational torque can be transmitted to the flap; a pin inserted into a peripheral portion of said flap so that the pin is rotatable; and a housing in which the duct, the flap, the shaft, and the pin are installed; wherein the flap is loaded from one end of the shaft via a spring in the axial direction of the shaft, the load is supported by the housing via the pin in the peripheral portion of the flap, and neither of a peripheral portion of a flap where a shaft is attached nor a peripheral portion a flap where a pin is inserted contacts said duct when the valve is fully opened. In the butterfly valve a driving force for opening and shutting does not change, and the butterfly valve smoothly opens and shuts even in use for a long period of time in a hot gas flow even in the case that the use of the valve at a high temperature causes an adhesion of oxidized scales or an increase of a coefficient of friction between members.

5 Claims, 8 Drawing Sheets

5,884,898

BUTTERFLY VALVE FOR HOT FLUID

BACKGROUND OF THE INVENTION AND RELATED ART STATEMENT

The present invention relates to a butterfly valve suitably used for changing flow paths for hot fluid, for example, an automobile exhaust gas.

A butterfly valve has been used for changing flow paths for hot fluid such as a hot combustion gas, for example, an automobile exhaust gas. The butterfly valve sometimes has a problem of difficulty in opening and shutting. This is because 1) seizure in a bearing portion, 2) adhesion of oxidized scales peeling off a pipe, and/or 3) an increase of a coefficient of friction at a high temperature between a material for a duct and a material for a flap cause(s) an increase of a torque required.

There have been other problems, i.e., deterioration of sealability when the flap is shut because of thermal deformation of the flap or corrosion and/or abrasion of the contact portion of the flap and an outer cylinder, leakage of a hot gas outside, and an increase of rotational resistance because of corrosion or abrasion of a shaft-bearing portion.

Therefore, an object of the present invention is to provide a butterfly valve which smoothly opens and shuts without changing the driving force for opening and shutting even in a hot-gas flowing path for a long period of time even in the case of an adhesion of oxidized scales or an increase of a coefficient of friction at high temperatures and which is free from thermal deformation of a flap and gas leakage by corrosion of a flap, an outer cylinder, a bearing portion, shaft, or the like.

SUMMARY OF THE INVENTION

According to the present invention there is provided a butterfly valve for hot fluid, comprising: a cylindrical duct; a flap pivotally mounted inside said duct; a shaft attached to said flap so that a rotational torque can be transmitted to the flap; a pin inserted into a peripheral portion of said flap so that the pin is rotatable; and a housing in which the duct, the flap, the shaft, and the pin are installed; wherein the flap is loaded from one end of the shaft via a spring in the axial direction of the shaft, the load is supported by the housing via the pin in the peripheral portion of the flap, and neither of a peripheral portion of a flap where a shaft is attached nor a peripheral portion of a flap where a pin is inserted contacts said duct when the valve is fully opened.

According to the present invention there is further provided a butterfly valve for hot fluid, comprising: a cylindrical duct; a flap pivotally mounted inside the duct; a shaft attached to the flap so that a rotational torque can be transmitted to the flap; a pin inserted into a peripheral portion of the flap so that the pin is rotatable; and a housing in which the duct, the flap, the shaft, and the pin is installed; wherein a ringed protrusion having the same axis as a hole for the shaft and/or a hole for the pin, is arranged around the hole arranged in the flap.

According to the present invention there is furthermore provided a butterfly valve comprising: two cylindrical ducts; a first flap and a second flap pivotally mounted inside each of said ducts, respectively; a driving shaft attached to the first flap so that a rotational torque can be transmitted to the first flap; a coupling shaft inserted into a peripheral portion of each of the first and the second flaps so that a rotational torque can be transmitted to the first and the second flaps; a pin inserted into a peripheral portion of the second flap, the portion being opposite to a portion where a coupling shaft is inserted, so that the pin is rotatable; and a housing in which the duct, the flap, the driving shaft, the coupling shaft, and the pin are installed.

BRIEF DESCRIPTION OF THE DRAWINGS

FIG. 1A is a cross-sectional explanatory view, and FIG. 1B is a plane.

FIG. 3A is a cross-sectional view, and FIG. 3B is a perspective view.

FIG. 4A is a view from the side where a flap is inserted into the shaft, FIG. 4B is a front view, and FIG. 4C is a view from the lever side.

FIG. 5A is a plane, FIG. 5B is a cross-sectional view, and FIG. 5C is a view from the bottom.

DETAILED DESCRIPTION OF THE INVENTION

Figure 1A:
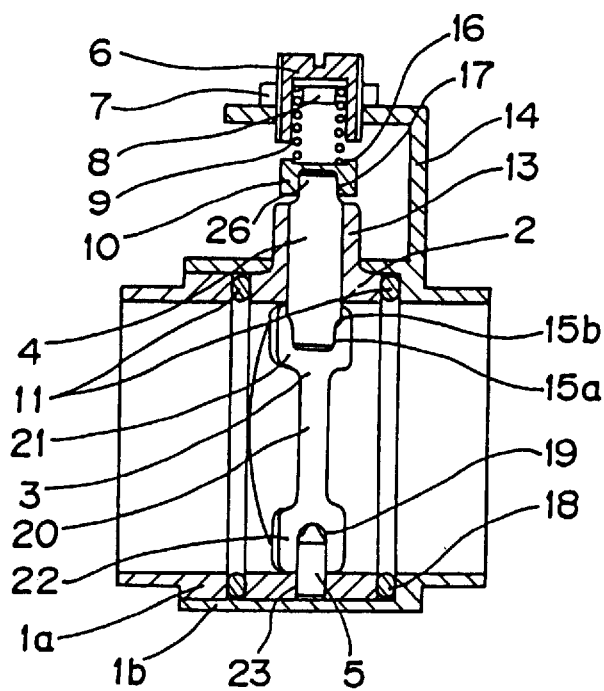
FIGS. 1A and 1B are explanatory views showing an embodiment of a butterfly valve of the present invention.

A butterfly valve of the present invention has a structure that a load is applied on a flap in the axial direction of a shaft via a spring from one end of the shaft, the load is supported by a housing via a pin in a peripheral portion of the flap, and neither of a peripheral portion of a flap where a shaft is attached nor a peripheral portion of a flap where a pin is inserted contacts the aforementioned duct when the valve is fully opened.

When a surface of the peripheral portion where a pin is inserted (usually a portion of the lower surface) of the flap contacts with a duct, the following problems are caused:

1) A coefficient of friction between the flap and the duct increases at a high temperature.
2) Oxidized scales, etc., peel off a metallic pipe and adhere to the contact surface, thereby increasing a coefficient of friction.
3) Because a temperature of the flap becomes highest, thermal expansion of the flap makes the contact force large, and when the outer surface of the flap contacts with the duct in a large area, a rotational torque against a frictional resistance is large.

Accordingly, in the present invention, the flap is raised up by a pin so that the outer surface does not contact with the duct, thereby decreasing the rotational torque against a frictional resistance. An area of the top end of the pin is preferably decreased and set in a hole for the pin so as to contact with the bottom surface of the hole because the contact portion can be made smaller, thereby decreasing a rotational torque against a frictional resistance.

Regardless of a direction and a position of a butterfly valve inside a pipe, it is required that the peripheral portion of the flap, where a shaft is attached (usually a portion of the upper surface of the flap), does not contact with the duct lest a rotational torque against a frictional resistance should increase by the contact. In the present invention, a load is applied to the flap via a spring from one end of the shaft. Therefore, even if the butterfly valve is positioned on a slant or in a horizontal direction, a certain clearance can be constantly maintained between a peripheral surface of the flap, where a shaft is attached, and the duct. Hereupon, a certain and appropriate load can be applied to the flap by loading via a spring even if the shaft, pin, and/or flap are/is thermally expanded at a high temperature.

In another embodiment of the present invention, a ringed protrusion is arranged around a hole for the shaft and/or a hole for the pin in the flap so as to have the same axis that the hole has. When the thus provided ringed portion having a small area around a hole contacts with the duct, a resistance torque against friction is small because a radius of the contact portion is small. Therefore, even if a coefficient of friction between two materials increases at a high temperature or a coefficient of friction increases because of adhesion of oxidized scales or the like, the torque is small, thereby avoiding a problem of difficulty in opening and shutting the flap.

The smaller a width of a ringed protrusion is, the more resistance torque can be reduced because the radius of the contact portion becomes smaller. The width of the ringed protrusion is preferably 6% or less of a diameter of the duct. When a width of the ringed protrusion is too small, a strength of the protrusion deteriorates and chipping is liable to occur. Therefore, the width is preferably 1% or more of a diameter of the duct.

On the other hand, when the contact area is made small by arranging the ringed protrusion, a gap between the flap and the duct increases, thereby increasing a leakage of fluid when the flap is shut. Accordingly, a shroud is provided in connection with the ringed protrusion, thereby reducing the leakage. A thickness of the shroud is preferably about the same as the width of the ringed protrusion. When a height of the shroud is higher than that of the ringed protrusion, only the shroud contacts with the duct, and a radius of the contact portion increases in comparison with a radius of the contact portion when the ringed protrusion contacts with the duct, causing an increase of the resistance torque. Therefore, a height of the shroud is required to be less than that of the ringed portion.

In the present invention, preferably, a housing consists of two members each having a shape of a cylinder with or without a step, one of the two cylindrical members has a step inside the member, a seal ring is positioned between the step and the duct, and another seal ring is positioned between the opposite side of the duct and the other cylindrical housing member.

In a method that a gap between the outer surface of the duct and the housing is sealed, when the duct is produced with silicon nitride and the housing is produced with a metallic material, a gap is generated in the diametral direction because a coefficient of thermal expansion of the housing is higher than that of the duct, thereby causing difficulty of sealability. Accordingly, the step is arranged inside the housing, where the seal ring is positioned. When the gap between the housing and a side of the duct is scaled by loading in the flow direction, an absolute value of the dimensional difference between the duct and the housing caused by the difference of thermal expansion is small because the thickness of the duct in the flow direction is small in comparison with a diameter of the duct. Therefore, an amount of elastic deformation required for a sealing material can be made small.

A dimensional difference between the duct and the housing by thermal expansion is proportional to a thickness of the duct in the flow direction. Therefore, a thickness of the duct in the flow direction is preferably 40% or less of the outer diameter of the duct because the aforementioned effect is more remarkable.

The dimensional difference between the duct and the housing caused by thermal expansion should be absorbed by elastic deformation in the direction of thickness of the seal ring so as not to have a gap between the duct and the housing. When a thickness of the seal ring is too small as compared to a width of the duct in the flow direction, the dimensional difference can not be absorbed. Accordingly, a total thickness of the seal ring before being mounted is preferably 20% or more of a width of the duct in the flow direction so as to solve the above problem.

Figure 9:
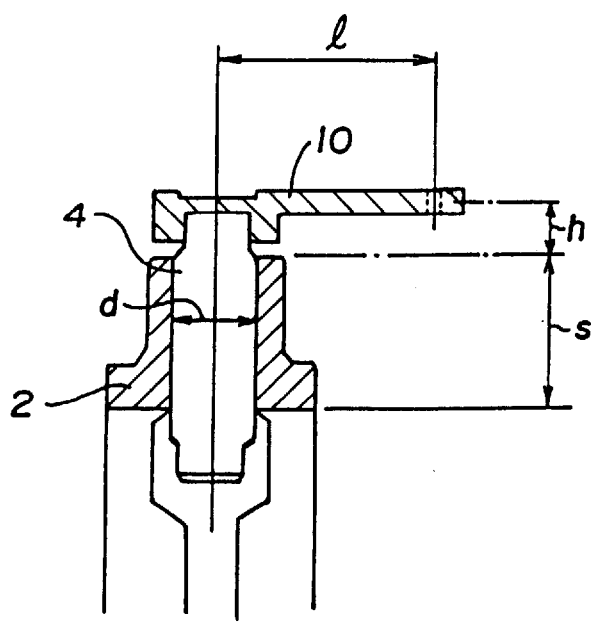
FIG. 9 is an explanatory view showing a relation of dimensions of a shaft and a lever.

In still another embodiment of the present invention, at least a shaft and a bearing portion of a duct are produced with silicon nitride or sialon. Each of a hole of the bearing portion and the shaft has a surface roughness of $R_{max} \leq 12.5$ μm. The butterfly valve has the lever and the bearing portion for the shaft as shown in FIG. 9. The lever has a length of l and a height of h. The bearing portion for the shaft has a length of S and an inner diameter of d. In the butterfly valve, the dimensions have a relation shown in Formula 1.
(Formula 1)

$$\frac{2l}{d(1 + 2h/S)} \geq 1.5$$

When a force applied to the lever so as to rotate the lever is expressed by F, a rotational torque $T_D$ is as follows:

$$T_D = l \cdot F$$

At this time, a force of $F+F \cdot h/S$ and a force of $Fh/S$ is loaded in the upper portion and the lower portion of the bearing portion, respectively, between the shaft and the bearing because of an equibrium of moments.

A rotational torque $T_R$ against a frictional resistance is as follows (η denotes coefficient of friction.):

$$T_R = \eta \cdot d(1+2h/S)/2$$

Therefore, when coefficient of friction η satisfies the following Formula 2, the shaft cannot rotate because $T_R \geq T_D$.
(Formula 2)

$$\eta \geq \frac{2l}{d(1 + 2h/S)} = \alpha$$

As a result of experiments and investigations from various angles, the inventors have found that when a bearing portion and a shaft are produced with silicon nitride or sialon and each has a surface roughness of $R_{max} \leq 12.5$, a coefficient of friction η obtained from Formula 2 increases from 0.3 at room temperature to an average of about 0.8 and that a frequency in occurrence of misoperation becomes within a practically allowable range by setting a value of a in the Formula 2 at 1.5 or more.

In the present invention, a butterfly valve may have a structure in which two of the aforementioned valve structures are combined. That is, the butterfly valve has two cylindrical ducts; a first flap and a second flap pivotally mounted inside each of said ducts, respectively; a driving shaft attached to the first flap so that a rotational torque can be transmitted to the first flap; a coupling shaft inserted into a peripheral portion of each of the first and the second flaps so that a rotational torque can be transmitted to the first and the second flaps; a pin inserted into a peripheral portion of the second flap, the portion being opposite to a portion where a coupling shaft is inserted, so that the pin is rotatable; and a housing in which the duct, the flap, the driving shaft, the coupling shaft, and the pin are installed.

In this structure of a butterfly valve, only one butterfly valve is required for changing two flow paths (a main flow path and a bypass) for fluid. Incidentally, as a matter of course, when one of the two flaps is opened, the other flap is shut in this case.

When a butterfly valve is used for a hot fluid such as an automobile exhaust gas, a normal metallic material has a high coefficient of thermal expansion and is deformed in a great amount at a high temperature, which is liable to cause a problem that a leakage of a fluid increases because a gap between the flap and the duct is enlarged when a valve is shut because of deformation of the flap or that a rotational resistance increases because of a contact of the flap and the duct. In such cases, each of the flap and the duct is produced with a material having an average coefficient of thermal expansion of preferably $7 \times 10^{-6}$ or less, more preferably $4 \times 10^{-6}$ or less at temperatures ranging from room temperature to 900° C. so as to solve the above problems.

Even if a normal metallic material having an average coefficient of thermal expansion of $7 \times 10^{-6}$ or less is used, a normal metallic material may have a problem of corrosion or abrasion. In order to solve the problems, at least one of the duct, the flap, the shaft, and the pin of the butterfly valve is preferably produced with silicon nitride or sialon.

The present invention is hereinbelow described in more detail with reference to the embodiments shown in the figures. However, the present invention is by no means limited to these embodiments.

Figure 1B:
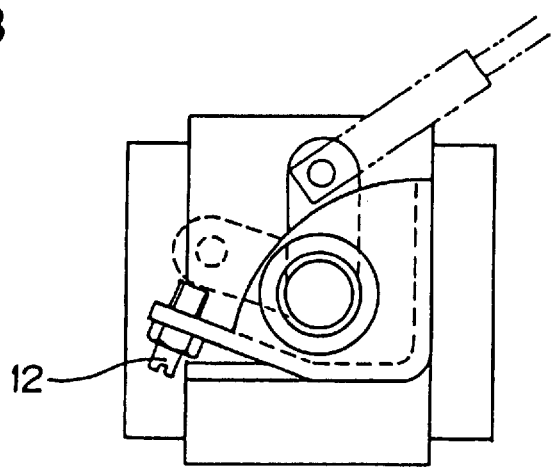
Figure 2:
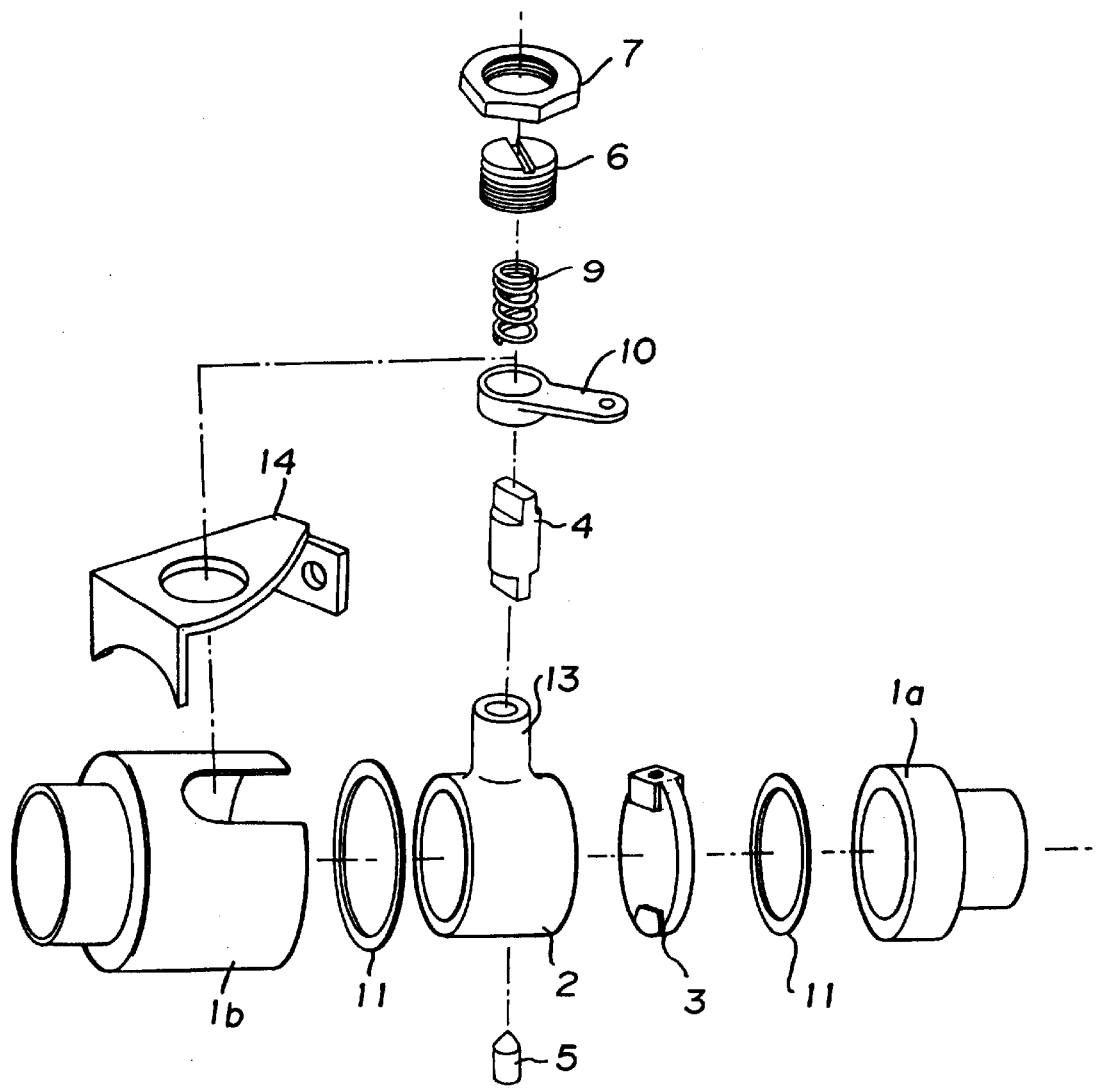
FIG. 2 is a perspective view of a disassembled butterfly valve of FIGS. 1A and 1B.

FIGS. 1A and 1B are cross-sectional explanatory views showing an embodiment of a butterfly valve of the present invention. FIG. 2 is a perspective view of a disassembled butterfly valve of FIGS. 1A and 1B. Reference numeral 2 is a duct of silicon nitride having an inner surface of a cylindrical shape and having a bearing portion 13 having an inner surface of a cylindrical shape positioned in the direction perpendicular to the axis of the duct 2. The duct 2 is provided with a hole 23 for a pin in the opposite side against the bearing portion 13.

Figure 3A:
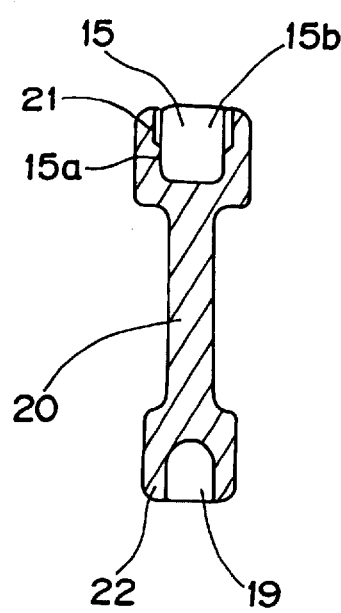
FIGS. 3A and 3B are explanatory views of a flap of the present invention.
Figure 3B:
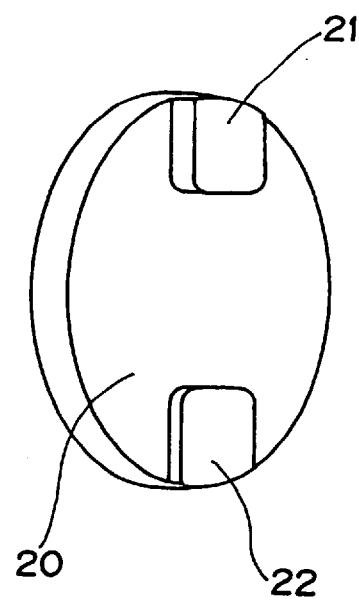

A flap 3 has an upper portion where a shaft 4 is inserted and a lower portion where a pin 5 is inserted. The flap 3 is installed in the duct 2 so as to be rotatable around the a common axis of the shaft 4 and the pin 5. As shown in FIGS. 3A and 3B, the flap 3 consists of a plate portion 20 having about an even thickness, a thick portion 21 in the shaft side which is thicker than the plate portion 20, and a thick portion 22 in the pin side which is also thicker than the plate portion. The periphery of the flap 3 has a cylindrical surface which is slanted at a predetermined angle (e.g. 20°) to the axis of the cylindrical shape of the duct 2. Therefore, when the butterfly valve is shut, the periphery of the flap 3 contacts with the inner surface of the duct 2 in the condition that a central surface of the plate portion is slanted at a predetermined angle (70° in the case that the flap 3 has a slant of 20°) to the central axis of the duct.

Incidentally, reference numeral 12 denotes a stopper.

Figure 4A:
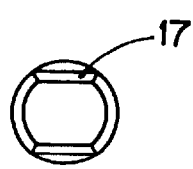
FIGS. 4A, 4B, and 4C are explanatory views of a shaft of the present invention.
Figure 4B:
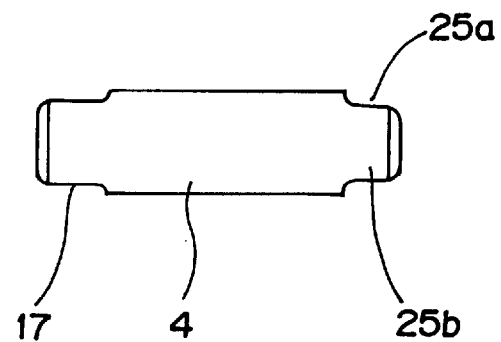
Figure 4C:
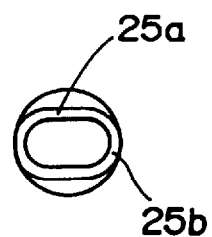

The flap 3 is provided with a hole 15 for a shaft in the thick portion 21 in the shaft side. The hole 15 for a shaft has two parallel surface portions 15a and two partially cylindrical surface portions 15b. A shaft 4 has a portion corresponding with the hole in the flap 3 as shown in FIG. 4. The portion has two parallel surface portions 25a and two partially cylindrical portions 25b and is inserted in the hole 15 for the shaft so that the portions 25a and 25b match the portions 15a and 15b, respectively. Accordingly, a rotational driving torque of shaft 4 is transmitted to the flap 3 by the interconnection of two surfaces 25a of the shaft 4 and the two parallel surfaces 15a of the hole 15.

In the two surface portions 25a, a clearance between the shaft 4 and the hole 15 is large in comparison with the two partially cylindrical portions 25b. Therefore, locating of the flap 3 and the shaft 4 is performed by the partially cylindrical portions 25b.

On the other hand, a pin 5 is inserted in a hole 19 in the flap 3 and a hole 23 of the duct 2. The top end of the portion to be inserted in the flap 3 has a shape of a cone having the round top end so that the pin contacts with the bottom of the hole 19 in a small area.

There is an appropriate clearance between a side surface of the pin 5 and the hole 19, and the flap 3 and the pin 5 are relatively rotatable.

There is an appropriate clearance between the shaft 4 and the bearing portion 13 so that the shaft 4 is rotatable in the bearing portion 13 even if a difference of thermal expansion or a thermal strain is generated.

Figure 5A:
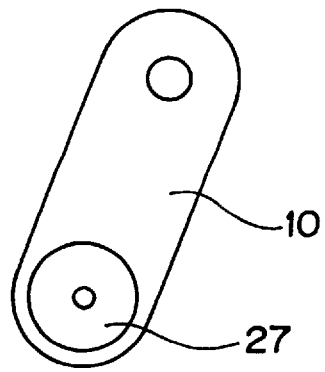
FIGS. 5A, 5B, and 5C are explanatory views of a lever of the present invention.
Figure 5B:
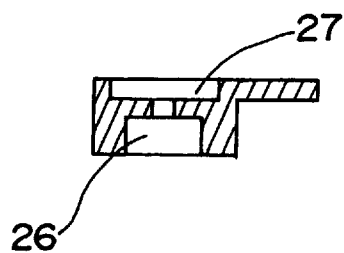
Figure 5C:
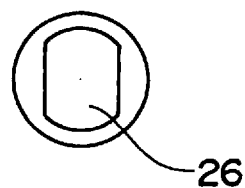

The shaft 4 is provided with a portion 17 having two parallel surfaces in the end opposite to the portion to be inserted in the flap. As show in FIGS. 5A, 5B, and 5C, the portion 17 is inserted in a hole 26 arranged in a lever 10. Thus, the lever 10 is mounted on the upper end of the shaft 4.

The lever 10 is provided with a depression 27 for bearing a spring and pressed in the axial direction of the shaft 4 by the spring 9 via the depression 27. A load by the spring 9 in the axial direction of the shaft is supported by a housing 1b via the lever 10, the shaft 4, the flap 3, and the pin 5. Since there is an appropriate clearance between the periphery of the flap 3 and the inner surface of the duct 2, when the flap 3 is opened, the periphery of the flap 3 does not contact with the inner surface of the duct 2.

The spring 9 is pressed in its upper portion by a cap 6 via a face chip 8. The cap 6 has a structure of a positive screw in its periphery and is fixed by a lock nut to a negative screw arranged in a bracket 14 fixed to the housing 1b by welding or the like.

The housing 1 consists of a positive housing 1a and a negative housing 1b. Two seal rings 11 and the duct 2 are installed in the housing 1 so as to be sandwiched by the housings 1a and 1b at the step 18 arranged inside the negative housing 1b. The positive housing 1a is fixed to the negative housing 1b by welding or the like with loading on the right end of the negative housing 1b and the left end of the positive housing 1a.

Incidentally, each of the duct, the shaft, the pin, and the flap is made from silicon nitride and has a coefficient of thermal expansion of $3.2 \times 10^{-6}$ and a four-point bending strength of 800 MPa or more at a temperature ranging from room temperature to 1000° C. in the present embodiment.

The other members are of stainless steel, and each of the members has a coefficient of thermal expansion of $15 \times 10^{-6}$.

Figure 6:
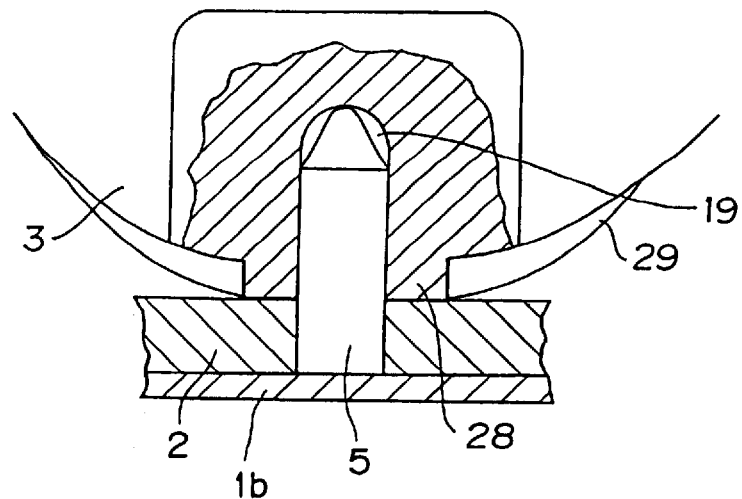
FIG. 6 is a partial explanatory view showing another embodiment of a butterfly valve of the present invention.
Figure 7:
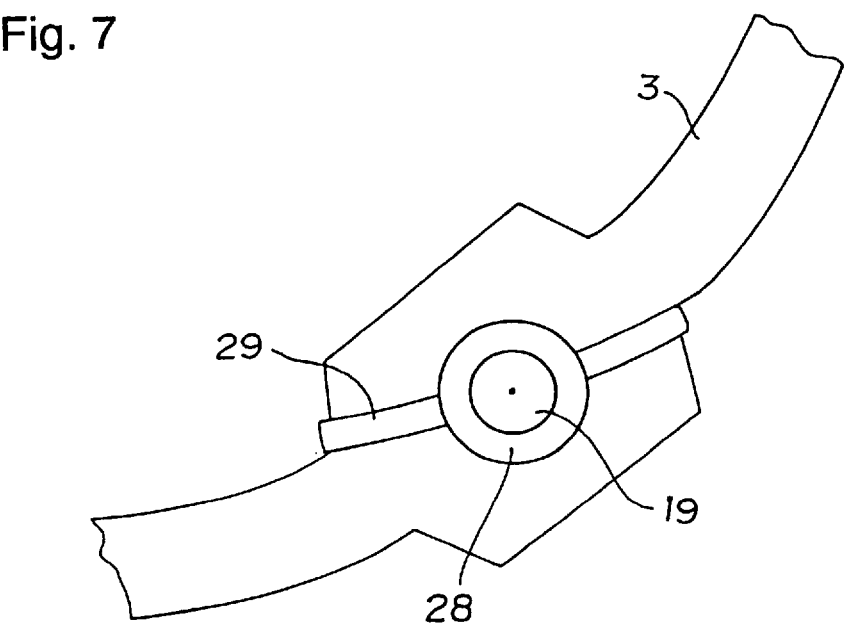
FIG. 7 is a partial perspective view showing another embodiment of a butterfly valve of the present invention.

FIGS. 6 and 7 are partial explanatory views showing another embodiment of a butterfly valve of the present invention. The flap 3 is provided with a hole 19 for a pin. Around the hole 19 is arranged a ringed protrusion 28 having the same axis that the hole 19 has. That is, the flap contacts with the duct 2 in a very small area around the hole 19 by arranging the ringed protrusion 28, thereby a radius of the contact portion is small and a resistance torque is small. The flap 3 is provided with a shroud 29 in connection with the ringed protrusion 28 lest a gap between the flap 3 and the duct 2 should increase, thereby making a leakage of fluid very small.

Figure 8:
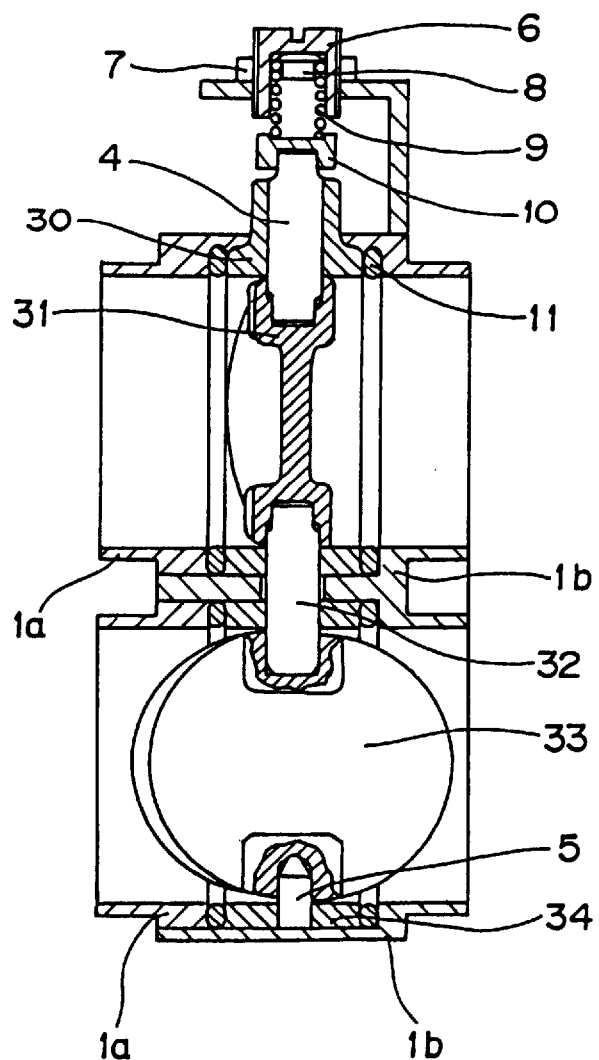
FIG. 8 is a cross-sectional view showing still another embodiment of a butterfly valve of the present invention.

FIG. 8 is a cross-sectional view showing still another embodiment of a butterfly valve of the present invention. The basic structure of this butterfly valve is the same as that of the butterfly valve of FIG. 1. The structure of the butterfly valve of FIG. 8 can be considered to be a combination of two structures of a butterfly shown in FIG. 1. The butterfly valve of FIG. 8 has two cylindrical ducts of an upper duct 30 and a lower duct 34. In the upper duct 30 and the lower duct 34, the first flap 30 and the second flap 33 are positioned, respectively, so that the flaps 30 and 33 are rotatable. Into the upper portion of the first flap 31, a driving shaft is inserted so that a rotational torque can be transmitted to the first flap 31. A coupling shaft 32 is inserted into the lower portion of the first flap 31 and the upper portion of the second flap 33 so that a rotational torque can be transmitted. The other structure is the same as that of the butterfly valve of FIG. 1.

[Opening and Shutting Test in a Hot Combustion Gas]

(Test 1)

There were produced butterfly valves each having one of the five combinations of materials, as shown in Table 1, for a flap 3, a duct 2, a shaft 4, and a pin 5. Incidentally, as shown in Table 1, each of the butterfly valves Nos. 2, 3, and 5, was provided with a clearance between the lower surface (a portion of the periphery where the pin 5 is inserted) of the flap 3 and the duct 2 so as to have a structure that an increase of a rotational torque against a frictional resistance at a high temperature can be controlled. On the other hand, each of the butterfly valves Nos. 1 and 4 was not provided with such a clearance and has a structure that the lower surface of the flap 3 and the duct 2 contact with each other. Each of these butterfly valves was tested for opening and shutting in a hot combustion gas and evaluated for a driving torque and a gas leakage. Concerning a driving torque, the results of the evaluation were given with [○] for the maximum torque for opening and shutting of the butterfly valve being less than 0.1 Nm (newton·meter), [Δ] for the maximum torque being in the range from 0.1 to 0.2 Nm, and [×] for the maximum torque being more than 0.2 Nm. Concerning a gas leakage, a gas at 600° C. was sent after the opening and shutting test, and a gas leakage (amount of leakage per minute in terms of 1 atm at 0° C.) was measured on condition that a difference of pressures between the streams upstream and downstream of butterfly valve is 100 mbar. The results were given with [○] for a gas leakage of less than 40 Nl/min, [Δ] for a gas leakage in the range from 40 to 100 Nl/min, and [×] for a gas leakage of more than 100 Nl/min. Incidentally, the opening and shutting test was conducted on condition that the pin 5 side of a butterfly valve faced downward (normal position). The other conditions for the test were as follows. The results of the test are shown in Table 1.

Temperature of combustion gas: about 1000° C.

Period of time for the opening and shutting test: 100 hours

Cycle of opening and shutting: 1.4 seconds per one cycle

Inner diameter of duct: 50 mm

Thickness of duct: 5 mm

Thickness of flap: 4 mm

Angle of flap when shut: 20°

Thickness of housing: 2 mm

TABLE 1

| No. | Material for flap | Material for duct | Material for shaft | Material for pin | Clearance between lower surface of flap and duct | Gas leakage | Driving torque |
|---|---|---|---|---|---|---|---|
| 1 | Stainless steel*1 | Stainless steel | Stainless steel | Stainless steel | None | x | x |
| 2 | Stainless steel | Stainless steel | Stainless steel | Stainless steel | Present | x | Δ |
| 3 | Silicon nitride*2 | Silicon nitride | Stainless steel | Stainless steel | Present | Δ | Δ |
| 4 | Silicon nitride | Silicon nitride | Silicon nitride | Silicon nitride | None | ○ | Δ |
| 5 | Silicon nitride | Silicon nitride | Silicon nitride | Silicon nitride | Present | ○ | ○ |

*1: Average coefficient of thermal expansion at a temperature ranging from room temperature to 900° C. is $15 \times 10^{-6}$.
*2: Average coefficient of thermal expansion at a temperature ranging from room temperature to 900° C. is $3.2 \times 10^{-6}$.

(Test 2)

A butterfly valve shown in FIGS. 1A and 1B was produced. The flap 3, the duct 2, the shaft 4, and the pin 5 were made from silicon nitride. As shown in Table 2, Nos. 7 and 8 were provided with a structure in which a load is supported in the axial direction of a shaft, i.e., a structure in which a load is applied to the flap 3 from the upper portion of the shaft 4 in the axial direction of the shaft, the load is supported by a housing 1 via the pin 5, and the upper surface of the flap 3 (a portion of the periphery of the flap 3 where a shaft 4 is set) and the duct 2 do not contact with each other. On the other hand, No. 6 was not provided with such a support so as to have a structure that when a butterfly valve is set with the pin 5 side facing upward (in the upside-down direction), the upper surface of the flap 3 (a portion of the periphery of the flap 3 where the shaft is set) contacts with the duct, and when the butterfly valve is set with the pin 5 side facing downward (in the normal direction), the lower surface of the flap 3 (a portion of the periphery of the flap 3 where the pin 5 is set inserted) contacts with the duct 2. Incidentally, in No. 8, a load from the upper portion of a shaft 4 in the axial direction of the shaft is applied via a spring 9 as shown in the figure, while in No. 7, a load is directly applied by a face chip 8 without using the spring 9. Each of these butterfly valves was subjected to an opening and shutting test in a hot combustion gas and evaluated for a driving torque. The conditions for the evaluation were same as in the Test 1. Incidentally, the opening and shutting test was conducted with setting a butterfly valve so that the pin 5 side faces upward (in the upside-down direction). The other conditions for the test were the same as in Test 1. The results of the test were shown in Table 2.

TABLE 2

| No. | Material for flap | Material for duct | Material for shaft | Material for pin | Support in axial direction of shaft | Spring | Driving torque |
|---|---|---|---|---|---|---|---|
| 6 | Silicon nitride | Silicon nitride | Silicon nitride | Silicon nitride | None | None | x |
| 7 | Silicon nitride | Silicon nitride | Silicon nitride | Silicon nitride | Present | None | x |
| 8 | Silicon nitride | Silicon nitride | Silicon nitride | Silicon nitride | Present | Present | o |

Butterfly valves as shown in FIGS. 1A and 1B were produced so that each of them has a length l and a height h of a lever 10 and a length S and a diameter d of a bearing portion for the shaft 4 shown in FIG. 9 as shown in Table 3. Incidentally, all of the flap 3, duct 2, shaft 4, and pin 5 were made from silicon nitride. Each of these butterfly valves was subjected an opening and shutting test in a hot combustion gas and the operation checked. The opening and shutting test was conducted with the pin 5 side facing downward (in a normal direction). The other conditions were the same as in Test 1 except that the period of time for the opening and shutting test was 200 hours. The results were shown in Table 3.

TABLE 3

| No. | l (mm) | d (mm) | S (mm) | h (mm) | 1 + 2 h/S | α | Misoperation |
|---|---|---|---|---|---|---|---|
| 9  | 25 | 8  | 11 | 19 | 4.45 | 1.40 | Present |
| 10 | 25 | 8  | 11 | 7  | 2.27 | 2.75 | None |
| 11 | 25 | 8  | 18 | 19 | 3.11 | 2.00 | None |
| 12 | 25 | 10 | 18 | 7  | 1.77 | 2.82 | None |
| 13 | 25 | 10 | 11 | 19 | 4.45 | 1.12 | Present |
| 14 | 25 | 10 | 11 | 7  | 2.27 | 2.20 | None |
| 15 | 25 | 12 | 18 | 19 | 3.11 | 1.33 | Present |
| 16 | 25 | 12 | 18 | 7  | 1.77 | 2.34 | None |
| 17 | 15 | 8  | 11 | 19 | 4.45 | 0.84 | Present |
| 18 | 15 | 8  | 11 | 7  | 2.27 | 1.65 | None |
| 19 | 15 | 10 | 18 | 19 | 3.11 | 0.96 | Present |
| 20 | 15 | 10 | 18 | 7  | 1.77 | 1.69 | None |
| 21 | 15 | 10 | 11 | 19 | 4.45 | 0.67 | Present |
| 22 | 15 | 12 | 11 | 7  | 2.27 | 1.10 | Present |
| 23 | 15 | 12 | 18 | 19 | 3.11 | 0.80 | Present |
| 24 | 15 | 12 | 18 | 7  | 1.77 | 1.41 | Present |

$$\alpha = \frac{2l}{d(1+2h+S)}$$

As described above, according to the present invention, there is provided a butterfly valve of which the driving force for opening and shutting does not change and smoothly opens and shuts and which is free from gas leakage caused by thermal deformation of a flap or corrosion of a flap, an outer cylinder, a bearing portion, a shaft, or the like, even in use for a long period of time in a hot gas flow even in the case that the use of the valve at a high temperature causes an adhesion of oxidized scales or an increase of a coefficient of friction between members.

What is claimed is:

1. A butterfly valve for hot fluid, comprising:
   a cylindrical duct;
   a flap pivotally mounted inside said duct;
   a shaft attached to said flap so that a rotational torque can be transmitted to the flap;
   a pin inserted into a peripheral portion of said flap so that the pin is rotatable; and
   a housing in which the duct, the flap, the shaft, and the pin are installed;
   wherein the flap is loaded from one end of the shaft via a spring in the axial direction of the shaft, the load is supported by the housing via the pin in the peripheral portion of the flap, and neither of the peripheral portion of the flap where the shaft is attached nor the peripheral portion of the flap where the pin is inserted contacts said duct when the valve is fully opened.

2. A butterfly valve according to claim 1, wherein the housing comprises two members each having a shape of a cylinder, one of the two cylindrical members has a step inside the member, a seal ring is positioned between the step and the duct, and another seal ring is positioned between an opposite side of the duct and the other cylindrical housing member.

3. A butterfly valve according to claim 1, wherein at least the shaft and the bearing portion of the duct are produced with silicon nitride or sialon, each of a hole of the bearing portion and the shaft has a surface roughness of $R_{max} \leq 12.5$ μm, the butterfly valve has a lever having a length of l and a height of h and the bearing portion having a length of S and an inner diameter of d, and the dimensions l, h, S, and d have a relation of:

$$\frac{2l}{d(1+2h/S)} \geq 1.5$$

4. A butterfly valve according to claim 1, wherein the duct and the flap are produced with a material having an average thermal coefficient of $7 \times 10^{-6}$ or less at a temperature ranging from room temperature to 900° C.

5. A butterfly valve according to claim 1, wherein at least one of the duct, flap, shaft, and pin is produced with silicon nitride or sialon.

* * * * *